G. C. HALEY.
FOWL HOLDER.
APPLICATION FILED DEC. 19, 1916.
1,237,777.
Patented Aug. 21, 1917.
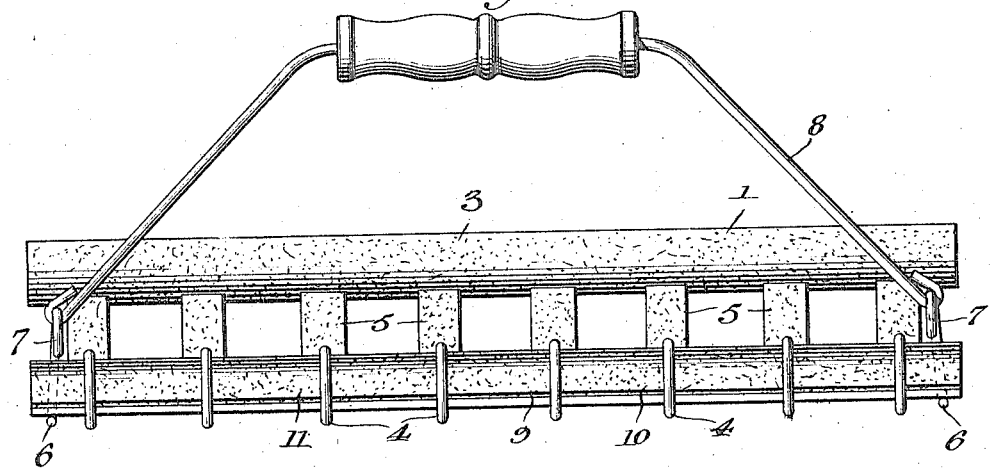
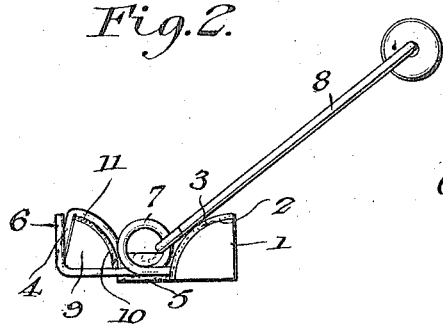
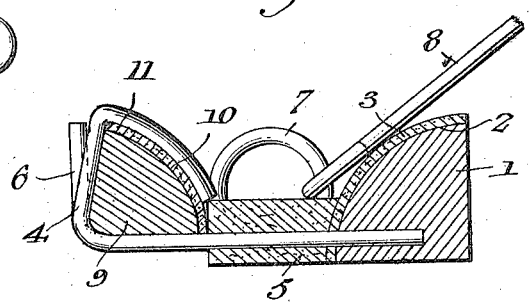
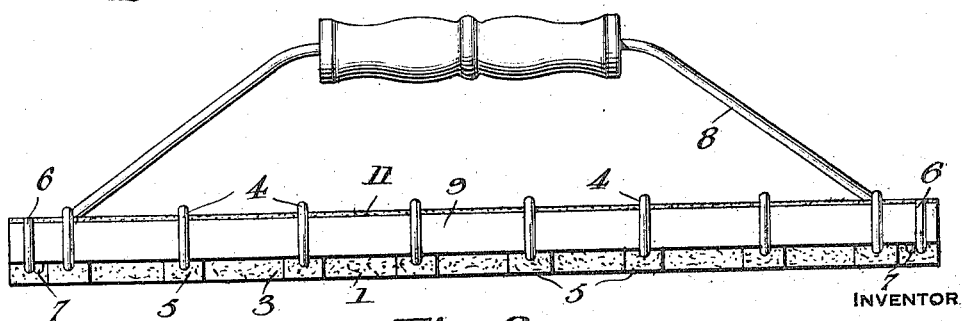
WITNESSES
Frederick W. Ely
L. Wilcox
INVENTOR
Grover C. Haley.
BY Victor J. Evans
ATTORNEY

UNITED STATES PATENT OFFICE.

GROVER C. HALEY, OF BROOKSVILLE, KENTUCKY.

FOWL-HOLDER.

1,237,777.  Specification of Letters Patent.  Patented Aug. 21, 1917.

Application filed December 19, 1916. Serial No. 137,864.

*To all whom it may concern:*

Be it known that I, GROVER C. HALEY, a citizen of the United States, residing at Brooksville, in the county of Bracken and State of Kentucky, have invented new and useful Improvements in Fowl-Holders, of which the following is a specification.

This invention relates to holders especially adapted to be used for retaining fowls and it consists in the novel features hereinafter described and claimed.

An object of the invention is to provide a holder of the character stated which is of simple and durable structure and which may be easily and quickly applied to the legs of the fowl and removed therefrom when desired.

The structure includes cushioning means whereby the hard or rigid parts of the device are prevented from coming in contact with the legs of the fowl and injuring the same. The holder includes a bar to which is attached a series of eyes and a second bar is arranged to slide longitudinally through the said eyes and is held in spaced relation with respect to the first mentioned bar. Hook members are mounted in the vicinity of the ends of the first mentioned bar and are provided with loops which receive the ends of a bail handle adapted to be used for carrying the device.

In the accompanying drawing:—

Figure 1 is a top plan view of the fowl holder.

Fig. 2 is an end view of the same.

Fig. 3 is a side view of the same;

Fig. 4 is a transverse sectional view of the same.

The fowl holder comprises a bar 1 which is preferably of wood and which is provided with an inner curved surface 2. A pad 3 of felt or other soft material is applied to the curved surface 2 of the bar 1. Eyes 4 of wire or similar material are mounted at spaced intervals along the bar and the openings through all of the said eyes are in alinement with each other. The shanks of the eyes 4 are surrounded by pads 5 of felt or other suitable material.

Hook members 6 are mounted upon the bar 1 in the vicinity of the ends thereof and the shanks of the said hooks are provided with loops 7 which receive the ends of a bail handle 8.

A bar 9 preferably of wood is arranged to slide through the openings of the eyes 4 and the said bar 9 is provided with a curved inner surface 10 upon which is mounted a pad 11 of felt or other similar soft material. The end portions of the hooks 6 engage the bar 9.

In use the bar 9 is removed from the eyes by slipping the same longitudinally out of the openings in the eyes and then the legs of the fowl or fowls are placed between the shanks of the eyes and the bar 9 is re-inserted in the openings of the eyes whereby the legs are confined between the shanks of the adjacent eyes and between the bars 1 and 9. Thus the fowl may stand upon its feet but it is shackled by the device and prevented from moving away from a certain particular spot or point at which the device is placed. Should it be desired to carry the device the bail handle 8 may be swung up over the bars 1 and 9 and above the body of the fowl which is confined and therefore the holder and the fowl may be readily carried from point to point.

From the foregoing description taken in conjunction with the accompanying drawing, it will be seen that a fowl holder of simple and durable structure is provided and that the same may be easily and quickly applied to or removed from the legs of a fowl and may be also used as means for carrying the same.

Having described the invention what is claimed is:—

1. A holder comprising a bar, eyes mounted thereon, a second bar mounted for sliding movement through the openings of the eyes, hooks mounted upon the first mentioned bar and engageable with the second mentioned bar and provided with loops and a bail handle engaging the said loops.

2. A holder comprising a bar having a curved surface, a pad located on said curved surface, eyes carried by the said bar, pads located upon the shanks of the eyes, a second bar mounted for sliding movement through the openings of the eyes, and provided with a curved surface, a pad located upon the curved surface of the second mentioned bar, hooks mounted upon the first mentioned bar and engageable with the second mentioned bar and having loops and a handle engaging said loops.

In testimony whereof I affix my signature.

GROVER C. HALEY.

Copies of this patent may be obtained for five cents each, by addressing the "Commissioner of Patents, Washington, D. C."